O. O. STORLE.
HARVESTER RAKE.

No. 105,139.  Patented July 5, 1870.

WITNESS.  INVENTOR.

United States Patent Office.

OLE O. STORLE, OF NORTH CAPE, WISCONSIN.

Letters Patent No. 105,139, dated July 5, 1870.

IMPROVEMENT IN HARVESTER-RAKES.

The Schedule referred to in these Letters Patent and making part of the same.

*To all whom it may concern:*

Be it known that I, OLE O. STORLE, of North Cape, in the county of Racine and State of Wisconsin, have invented a new and useful Improvement in Harvester-Rakes; and I do hereby declare that the following is a full, clear, and exact description thereof, which will enable those skilled in the art to make and use the same, reference being had to accompanying drawing forming part of specification, in which—

Figure 1:
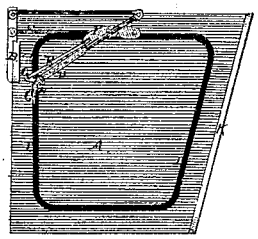
Figure 2:
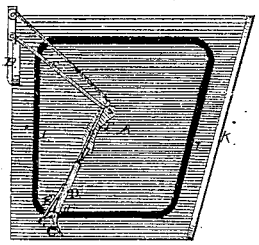

Figure 1 is a view of my rake just starting to rake a gavel;

Figure 2, a view of same just as it has crossed the platform with a gavel; and

Figure 3:
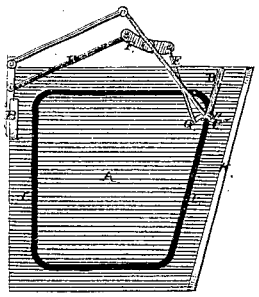

Figure 3, a view of same just as it delivers the gavel from the back of the platform.

Similar letters of reference in each of the figures indicate corresponding parts.

The object of my invention is to provide a rake that will rake the gavel from the platform, and gather it into a close mass for binding.

A is the platform.

B is a raised portion of same, to which the rake and compressing-rod are attached.

C, the rake.

D, the compressor bent over the rake-arm, to prevent the grain from falling between the compressor and the rake-arm.

E, the rods, which operate the compressor.

F, the joint of the compressor-rod attached to the rake-handle.

G, joint of the compressor where the rod which operates it is attached to it.

H, pivot on the rake passing through the platform and attached to the chain, not shown, which gives the rake motion.

I, groove in the platform through which pivot H works.

K, side of platform, against which the rake carries the grain.

Operation.

The rake, being in the position, plate 1, the team is started, the rake moves up to the turn in the front end of the platform where the grain is cut, shoves the grain across the platform, pushing it against the side of the platform K, as shown, fig. 2, pushing it along said elevated side, the compressor being thrown out and compressing it till it arrives at the position as shown, fig. 3, when the grain is dropped on the ground in a compacted bundle, and the rake moves on again to take another gavel.

What I claim as my invention and desire to secure by Letters Patent, is—

Rake C, compressor D, rods E, joints F and G, all in combination, substantially as described.

OLE O. STORLE.

Witnesses:
J. B. SMITH,
W. M. HOMOR.